United States Patent
Molinari (10) Patent No.: US 8,944,937 B2
(45) Date of Patent: Feb. 3, 2015

(54) METHOD OF RECYCLING A BALL AND BALL FOR USE IN RECYCLING METHOD

(75) Inventor: Arthur Molinari, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 245 days.

(21) Appl. No.: 13/483,718

(22) Filed: May 30, 2012

(65) Prior Publication Data

US 2013/0165267 A1    Jun. 27, 2013

Related U.S. Application Data

(60) Provisional application No. 61/580,525, filed on Dec. 27, 2011.

(51) Int. Cl.
*A63B 37/04* (2006.01)
*A63B 37/06* (2006.01)

(52) U.S. Cl.
USPC ............ 473/376; 473/370; 473/371; 473/377

(58) Field of Classification Search
USPC ................ 473/370, 371, 373, 374, 376, 377
See application file for complete search history.

(56) References Cited

U.S. PATENT DOCUMENTS

| | | |
|---|---|---|
| 696,351 A | 3/1902 | Richards |
| 1,533,563 A | 4/1925 | Maggi |
| 2,079,615 A | 5/1937 | Holt et al. |
| 2,083,155 A | 6/1937 | Leguillon |
| 2,258,333 A | 10/1941 | Miller |
| 5,150,906 A | 9/1992 | Molitor et al. |
| 5,389,169 A | 2/1995 | McRae |
| 5,390,932 A | 2/1995 | Russo |
| 5,427,377 A | 6/1995 | Maruoka |
| 5,566,832 A | 10/1996 | Stueckrad et al. |
| 5,566,889 A | 10/1996 | Preiss |
| 5,574,107 A | 11/1996 | Hiraoka et al. |
| 5,589,546 A | 12/1996 | Hiraoka et al. |
| 5,645,786 A | 7/1997 | Okada et al. |
| 5,733,974 A | 3/1998 | Yamada et al. |
| 5,783,293 A | 7/1998 | Lammi |
| 5,865,009 A | 2/1999 | Jackson et al. |
| 5,976,430 A | 11/1999 | Kataoka et al. |
| 5,984,807 A * | 11/1999 | Wai et al. ............... 473/376 |
| 6,033,611 A | 3/2000 | Yamaguchi |
| 6,120,714 A | 9/2000 | Allan et al. |
| 6,129,881 A | 10/2000 | Puniello |
| 6,139,447 A | 10/2000 | Ohama |
| 6,213,893 B1 * | 4/2001 | Maruko et al. ........... 473/370 |
| 6,296,578 B1 * | 10/2001 | Masutani ............... 473/368 |
| 6,338,840 B1 | 1/2002 | Allan et al. |
| 6,383,091 B1 * | 5/2002 | Maruko et al. ........... 473/373 |

(Continued)

FOREIGN PATENT DOCUMENTS

| | | |
|---|---|---|
| GB | 2163437 A | 2/1986 |
| JP | 06285856 A | 10/1994 |

(Continued)

*Primary Examiner* — Eugene Kim
*Assistant Examiner* — John E Simms, Jr.
(74) *Attorney, Agent, or Firm* — Honigman Miller Schwartz and Cohn LLP; Anna M. Budde; Jonathan P. O'Brien (57) ABSTRACT

A method of recycling a multi-material inner part of a golf ball includes a variety of steps. The inner part and cover are separated from one another. The inner part is pulverized into pieces. The pieces are placed in a liquid to separate the pieces of one material from the pieces of the other materials. A ball designed for use in such a system is also disclosed.

12 Claims, 6 Drawing Sheets

(56) References Cited

U.S. PATENT DOCUMENTS

| | | | |
|---|---|---|---|
| 6,406,385 B1 * | 6/2002 | Masutani et al. | 473/378 |
| 6,555,627 B2 | 4/2003 | Bissonnette et al. | |
| 6,575,728 B2 | 6/2003 | Brum | |
| 6,575,848 B2 | 6/2003 | Bissonnette et al. | |
| 6,612,941 B2 | 9/2003 | Kennedy, III et al. | |
| 6,676,541 B2 | 1/2004 | Cavallaro et al. | |
| 6,692,380 B2 | 2/2004 | Sullivan et al. | |
| 6,703,005 B2 | 3/2004 | Allan et al. | |
| 6,716,954 B2 | 4/2004 | Keller et al. | |
| 6,790,147 B2 | 9/2004 | Bissonnette et al. | |
| 6,802,785 B2 * | 10/2004 | Jordan et al. | 473/378 |
| 6,833,098 B2 | 12/2004 | Watabe et al. | |
| 6,835,779 B2 | 12/2004 | Voorheis et al. | |
| 6,852,042 B2 | 2/2005 | Sullivan et al. | |
| 6,884,182 B2 * | 4/2005 | Nardacci | 473/374 |
| 7,029,614 B2 | 4/2006 | Tanaka et al. | |
| 7,063,630 B2 | 6/2006 | Cavallaro | |
| 7,090,592 B2 | 8/2006 | Watanabe et al. | |
| 7,141,196 B2 | 11/2006 | Sullivan et al. | |
| 7,148,262 B2 | 12/2006 | Danner et al. | |
| 7,148,279 B2 | 12/2006 | Voorheis et al. | |
| 7,261,535 B2 | 8/2007 | Puniello et al. | |
| 7,285,058 B2 | 10/2007 | Sullivan et al. | |
| 7,335,326 B2 | 2/2008 | Brum | |
| 7,407,378 B2 | 8/2008 | Brum | |
| 7,862,760 B2 | 1/2011 | Puniello et al. | |
| 7,874,940 B2 | 1/2011 | Kim et al. | |
| 8,012,044 B2 | 9/2011 | Kennedy, III et al. | |
| 2002/0016225 A1 * | 2/2002 | Maruko et al. | 473/377 |
| 2002/0091016 A1 | 7/2002 | Wachi | |
| 2002/0160861 A1 | 10/2002 | Wachi | |
| 2003/0083153 A1 * | 5/2003 | Sullivan et al. | 473/351 |
| 2003/0148824 A1 | 8/2003 | Wachi | |
| 2005/0233835 A1 * | 10/2005 | Nesbitt | 473/371 |
| 2008/0217810 A1 | 9/2008 | Nagasawa et al. | |
| 2008/0249251 A1 | 10/2008 | Wachi | |
| 2009/0137343 A1 | 5/2009 | Morgan et al. | |
| 2010/0004069 A1 | 1/2010 | Hebert et al. | |
| 2010/0029412 A1 | 2/2010 | Simonutti et al. | |
| 2011/0152008 A1 | 6/2011 | Kim et al. | |
| 2012/0040775 A1 | 2/2012 | Ichikawa | |

FOREIGN PATENT DOCUMENTS

| | | | | |
|---|---|---|---|---|
| JP | 2004-180978 | * | 7/2004 | A63B 37/00 |
| KR | 2005119048 A | | 12/2005 | |
| WO | WO0057962 A1 | | 10/2000 | |
| WO | WO0124888 A1 | | 4/2001 | |

* cited by examiner

METHOD OF RECYCLING A BALL AND BALL FOR USE IN RECYCLING METHOD

CROSS-REFERENCE TO RELATED APPLICATION

This application claims priority under 35 U.S.C. §119(e) to U.S. Provisional Patent Application No. 61/580,525, entitled "Method of Recycling a Ball and Ball for Use in Recycling Method", and filed on Dec. 27, 2011, which application is hereby incorporated by reference.

FIELD

The present disclosure relates generally to a method of recycling a golf ball and a ball structure useful in the method. Specifically, the present disclosure includes a ball having multiple inner layers joined only mechanically which are easily separated for recycling.

BACKGROUND

Golf balls are traditionally made with multiple layers superposed on each other. Each layer is typically included to impart a particular quality to the ball.

The cover, for example, provides an outer scuff protection and provides particular aerodynamic properties to the ball. The aerodynamics of the ball are governed by many factors, but are frequently governed by the size, shape, and arrangement of the dimples on the exterior surface of the cover. The durability and scuff resistance of the ball is governed by additional factors, but is also governed by the material from which the cover is made.

The material or materials used to form the interior of the golf ball typically determine other flight and feel characteristics of the ball. The density of the core, for instance, typically determines the compression of the ball. The compression of the ball affects, for example, the distance a ball flies when struck by a club. For example, a golfer with a slower swing, like that common with a less experienced golfer, may achieve a better distance with a golf ball having a lower compression. The lower the compression number, the more the ball compresses on impact and the softer the core.

Other layers may be present in the ball as well. These layers may be inserted to affect the compression of the ball or to control spin or the like.

When a ball includes multiple superposed layers, a designer often must choose between two potentially undesirable options. A first undesirable option is for the layers to simply be placed adjacent one another without securing the layers to one another. If the layers are positioned in such a manner, the layers will tend to shift with respect to one another, possibly as often as with each stroke. This shifting will tend to create bunching and discontinuities in the ball, which leads to the cracking of the cover and a quick deterioration of the ball. The other undesirable option is for the designer to secure adjacent layers together with adhesive. If adhesive is used, the recyclability of the ball is reduced. The inclusion of adhesive adds so much effort in and energy expense to the recycling process due to the effort in some instances to separate the layers and in other instances to remove the adhesive residue that would tend to cling to one or the other of the adjacent layers. In still other instances, both of these processes would need to take place before any recycling could take place. The time and energy expended in doing one or more of these processes dramatically reduces or eliminates the benefits desired from recycling.

Therefore, it is desirable to develop a cost-effective process for recycling a multi-layer core or inner part of a ball. It is also desirable to develop a ball that may be used in such a process, particularly if the ball includes minimal adhesive.

SUMMARY

In one aspect, a golf ball having two parts is disclosed. The first part may be an inner part. The inner part may include at least two layers, the two layers being only mechanically secured to one another. The second part may be a cover. The cover may be only chemically secured to the core. The cover may be secured to the core by adhesive, but the core is desirably free from adhesive.

In another aspect, a method of recycling a golf ball is disclosed. A golf ball is provided. The golf ball may include a cover and an inner part. The inner part may be made from at least a first material and a second material. The materials forming the inner part may be only mechanically secured to one another. The cover and the inner part may be only chemically secured to one another. The method may separate the cover and the inner part from one another. The inner part may be pulverized into pieces. The pulverized pieces formed from different materials may then be separated from one another. These pieces may then be recycled for other use.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

The present disclosure relates to a method of recycling a layered golf ball core made from more than one material. A golf ball designed to be used in that process is also disclosed. Various embodiments of the golf ball structure will first be disclosed and then the embodiments of the method.

Figure 1:
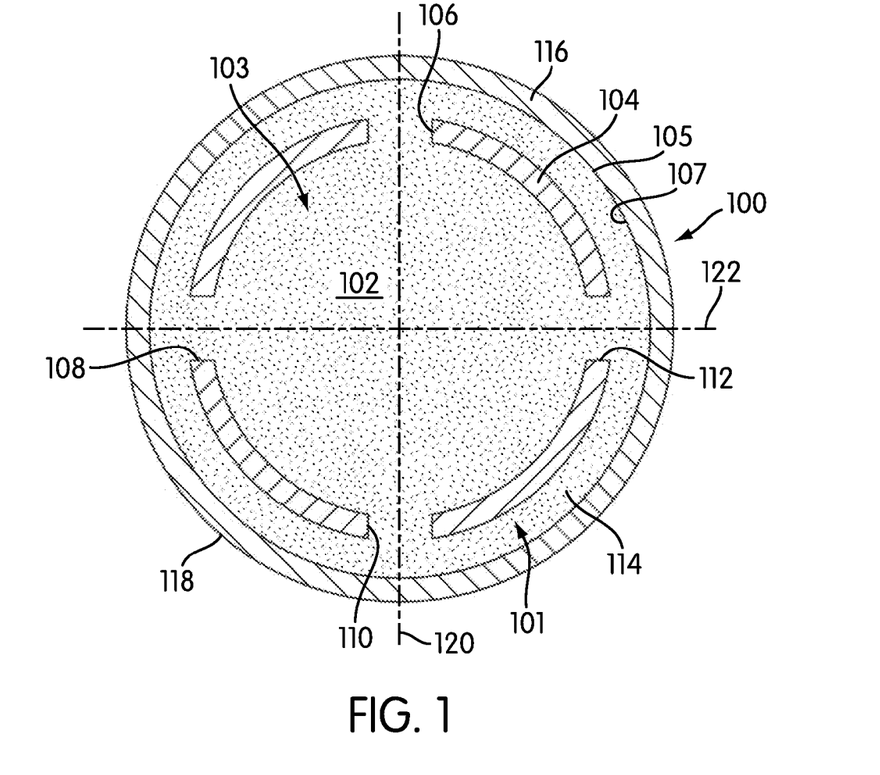
FIG. 1 is a cross section of an embodiment of a golf ball.

Turning first to FIG. 1, an embodiment of a golf ball 100 is shown. Golf ball 100 includes a plurality of parts, which can be described as being a cover 116 and an inner part 103. Inner part 103 includes core 102, outer core layer 104, and medial layer 114, which are only mechanically connected to one another. Core 102 forms the innermost layer of inner part 103. Outer core layer 104 partially surrounds and is positioned radially outward of core 102. Medial layer 114 at least partially surrounds and is positioned radially outward of outer core layer 104. Cover 116 at least partially surrounds and is positioned radially outward of medial layer 114. Accordingly, in one aspect, golf ball 100 can be considered as including four layers. Core 102, outer core layer 104, and medial layer 114, including all the sub-parts, may be considered the inner part 103 of ball 100, and cover 116 may be considered the external layer or part.

Outer core layer 104 may be hollow and may be substantially spherical. Outer core layer 104 may include a plurality of perforations that penetrate through outer core layer 104. In the embodiment shown in FIG. 1 along the specific cross section taken, there are four perforations shown, specifically first perforation 106, second perforation 108, third perforation 110, and fourth perforation 112. In FIG. 1, first perforation 106, second perforation 108, third perforation 110, and fourth perforation 112 are shown as being substantially equal in size and approximately evenly spaced around a circumference of outer core layer 104. However, such sizing and arrangement are exemplary only. Other possible embodiments and examples are possible and are interchangeable with the outer core layer 104 shown in FIG. 1. In some embodiments, outer core layer 104 may be made in a process disclosed in U.S. Patent Publication No. 2013/0161876, entitled "Method of Molding a Single-Piece Hollow Shell Including Perforations" filed concurrently herewith, the disclosure of which is incorporated by reference. In some embodiments, the ball of this disclosure may be formed in accordance with a method of making as described in U.S. Patent Publication No. 2013/0165260, entitled "Golf Ball with Co-Molded Core and Medial Layer and Method of Making" filed concurrently herewith, the disclosure of which is incorporated by reference.

Cover 116 is shown in the FIGS. in simplified form. In a commercial version, cover 116, and in particular, outer surface 118 of cover 116, is configured to be struck by a golf club. Accordingly, cover 116 may include various dimples, frets or lands, projections, printing, or any other features that a designer thinks would be desirable in affecting the flight path of ball 100. The particular patterns on cover 116 may be determined by a person having ordinary skill in the art. Cover 116 may be designed to be scuff resistant. Cover 116 may be made of any material deemed desirable for a golf ball cover, such as SURLYN or other polyurethane elastomer that has appropriate properties for a golf ball cover.

Cover 116 is desirably secured to inner part 103 only chemically. In some embodiments, an adhesive may be applied to outer surface 105 of inner part 103 or inner surface 107 of cover 116 in embodiments where that is possible. Cover 116 may then be applied to outer surface 105. In some embodiments, cover 116 can be overmolded directly over inner part 103. In other embodiments, cover 116 can be made in two parts that are then pressed onto inner part 103 and fused together along a joinder line (not shown). When cover 116 comes into contact with inner part 103, the adhesive will cause cover 116 and inner part 103 to chemically bond with one another. The adhesive will bond cover 116 and inner part 103 and minimize the relative movement therebetween without the need for a physical locking structure to be molded into either cover 116 or inner part 103.

As shown in FIG. 1, first material 101 is used to integrally form core 102 and medial layer 114 and projects into and passes through first perforation 106, second perforation 108, third perforation 110, and fourth perforation 112. First perforation 106, second perforation 108, third perforation 110, and fourth perforation 112 are shaped and sized in such a manner as to allow passage of first material 101 through first perforation 106, second perforation 108, third perforation 110, and fourth perforation 112. Sizing and shaping each of first perforation 106, second perforation 108, third perforation 110, and fourth perforation 112 in this manner allows core 102 and medial layer 114 to be joined to or formed integrally with one another. As shown in FIG. 1, first material 101 fills each of first perforation 106, second perforation 108, third perforation 110, and fourth perforation 112.

The embodiment of outer core layer 104 shown in FIG. 1 defines four perforations, namely, first perforation 106, second perforation 108, third perforation 110, and fourth perforation 112. First perforation 106 and third perforation 110 are generally aligned with one another along first axis 120. Second perforation 108 and fourth perforation 112 are generally aligned with one another along second axis 122. In the embodiment shown in FIG. 1, first axis 120 and second axis 122 are generally perpendicular to one another. This number and placement of perforations is exemplary and may take other forms.

The qualities of the first material and the projections may vary depending on the full design of the ball. For example, in some embodiments, the first material may have a higher viscosity than the material shown in FIG. 1. In some embodiments, the outer core layer may be thicker than that shown in FIG. 1. In such an instance, it may be possible for the first material to be capable of only projecting partially through at least one of the perforations in the outer core layer from one or both of the core side or the medial layer side. In addition, in some embodiments, depending on the shape and size of the perforations and the flow characteristics of the first material, some perforations in the outer core layer may be completely filled and other perforations may be only partially filled. In some embodiments, the first material may join the core and medial layer through one or more projections, but the size of the area in which the core and medial layer are joined may be narrower or smaller in other ways than by completely filling each perforation.

The material selected to be used as the first material may be any of the typical materials used in manufacturing cores or other interior layers of a conventional golf ball. For example, the first material may be a thermoplastic urethane, highly neutralized polymer, or rubber, such as a polybutadiene rubber. In many embodiments, it may be useful to use a material that is solid, rather than liquid, at room temperature. The material selected for the first material may have a first density.

The material used to form outer core layer 104 may be similar to that used for core 102 and medial layer 114. However, it may be desirable to form outer core layer 104 from a second material different from first material 101. In some embodiments, it may be desirable for first material 101 to be softer than the second material, and in other embodiments, it may be desirable for the second material to be softer than first material 101. In some embodiments, it may be desirable for first material 101 to have a higher density than the second material, and in other embodiments, it may be desirable for the second material to have a higher density than the first material. It may be desirable for first material 101 and the second material to differ in other respects, such as elasticity, melting temperature, and the like. Golf balls have often been made with layers having different material properties, and a person having ordinary skill in the art can select appropriate materials for the core and medial layers, outer core layer, and cover that provide a desired set of flight properties.

A person having ordinary skill in the art will be able to select an outer core layer that has the appropriate properties useful for a particular application. In some embodiments, it may be desirable for the core and medial layers to be joined together over as much surface area as possible. In such an instance, a person having ordinary skill in the art might select an outer core layer that defines a larger number of perforations. In other instances, it may be desirable to include a larger amount of the second material. In such an instance, a person having ordinary skill in the art might select an outer core layer that defines a smaller number of perforations or an outer core layer that has a larger thickness. In yet other instances, a person having ordinary skill in the art may wish to maximize the flow of the first material through the outer core layer in the molding process. In such an instance, the selection of a perforation pattern that encourages a particular flow pattern may be desirable. Based on the characteristics desired by the person having ordinary skill in the art, the outer core layer and perforation configuration can be designed to accommodate the desired results.

The use of the perforations in outer core layer 104 allows the layers of inner part 103 to be joined only through mechanical means, rather than chemically bonding the layers with an adhesive. The use of first perforation 106, second perforation 108, third perforation 110, and fourth perforation 112, or any alternative number of perforations, allows first material 101 to flow into outer core layer 104 to form core 102 and to flow outside outer core layer 104 to form medial layer 114. This structure allows outer core layer 104 to be mechanically sandwiched between core 102 and medial layer 114, so that shifting or movement between core 102 and outer core layer 104 is minimized, as is shifting or movement between outer core layer 104 and medial layer 114. In addition, the integral molding of core 102 and medial layer 114, along with the interposition or sandwiching of outer core layer between core 102 and medial layer 114, minimizes or eliminates shifting or relative movement between core 102 and medial layer 114. This minimization or elimination of shifting is done only by the mechanical joining of core 102, outer core layer 104, and medial layer 114 of inner part 103.

Figure 2:
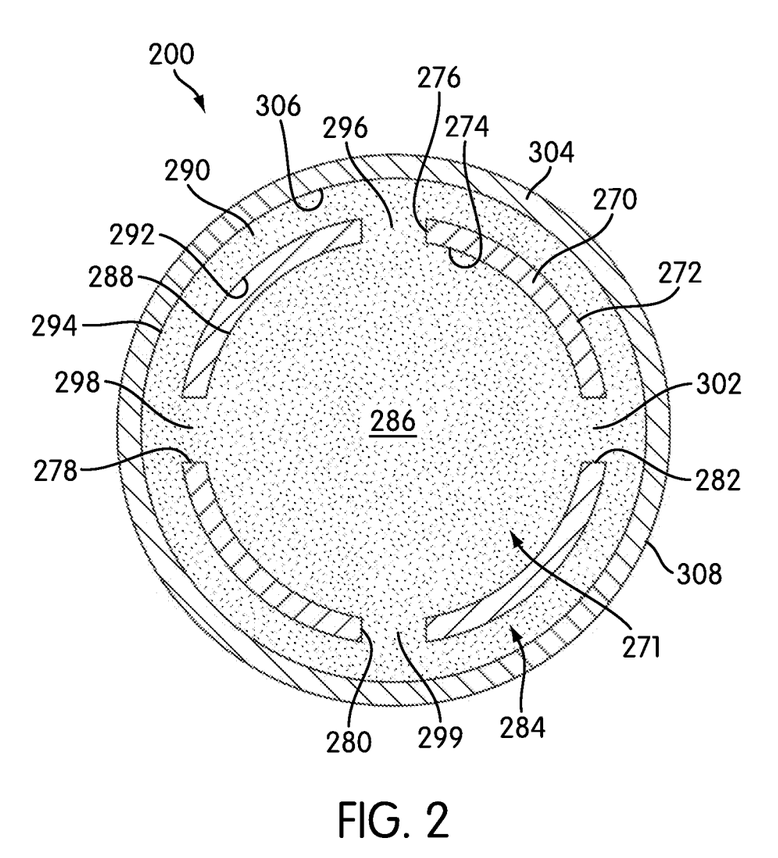
FIG. 2 is a cross section of another embodiment of a golf ball.

Ball 100 was described above as having four layers, namely, core 102, outer core layer 104, medial layer 114, and cover 116. However, ball 100 may also be described as having three layers or strata. FIG. 2 illustrates ball 200 having the same structure as ball 100 of FIG. 1. As shown in FIG. 2, inner part 271 includes first stratum 270 and second stratum 284. First stratum 270 is hollow and may be substantially spherical. First stratum 270 has an outer surface 272 and an inner surface 274. First stratum 270 defines a plurality of perforations passing through first stratum 270 and extending from outer surface 272 to inner surface 274. In the embodiment shown in FIG. 2, the perforations include first perforation 276, second perforation 278, third perforation 280, and fourth perforation 282. The cross-sectional shape of the perforations may be any shape that is reasonably feasible in a given molding process and that provide appropriate stability to first stratum 270. The perforations may have the same shape or different shapes. While there are four perforations shown along this cross-sectional line, first stratum 270 may have any desirable number of perforations. However, it is desirable for first stratum 270 to define at least one perforation.

Second stratum 284 is desirably integrally formed and has three substrata positioned in different locations relative to first stratum 270. First substratum 286 comprises and may be considered to generally be a substantially spherical solid that is desirably positioned at the center of ball 200. First substratum 286 may form the core of ball 200. Because first substratum 286 is generally solid, it includes only an outer surface 288. Outer surface 288 of first substratum 286 is adjacent inner surface 274 of first stratum 270.

Third substratum 290 comprises and many be generally considered to be substantially hollow and substantially spherical. Because it is generally hollow, third substratum 290 includes inner surface 292 and outer surface 294. Inner surface 292 of third substratum 290 is positioned adjacent outer surface 272 of first stratum 270.

The second substratum of second stratum 284 comprises a plurality of fingers. These include first finger 296, second finger 298, third finger 299, and fourth finger 302. Each of first finger 296, second finger 298, third finger 299, and fourth finger 202 extends between outer surface 288 of first substratum 286 and inner surface 292 of third substratum 290. Each finger could be considered to extend from inner surface 292 to outer surface 288 or to extend equally from outer surface 288 to inner surface 292. In addition, second substratum 284 and first stratum 270 could be considered to be sandwiched between first substratum 286 and third substratum 290.

In many embodiments, it may be desirable for the number of fingers in the second substratum to correspond with the number of perforations in the first stratum. Accordingly, if the first stratum defines only a single perforation, the second substratum would desirably only include a single finger. Also, a molding process may be used that forms all of the second stratum integrally. In such an instance, the first substratum, the second substratum, and the third substratum are integrally formed and form a single piece. The use of such a molding process increases the likelihood that a finger will be positioned in each perforation. In addition, the use of such a molding process facilitates or encourages the material forming the second stratum to completely fill the mold cavity. Such a molding process tends to create a ball where at least one finger in the second substratum completely fills at least one perforation in the first stratum. In many cases, each finger will substantially fill a corresponding one of the perforations. The degree to which each perforation will be filled by a corresponding finger depends on many factors, including the materials selected for the first stratum and the second stratum, the temperature of the mold, various atmospheric conditions, and the like.

The use of the perforations in first stratum 270 allows the layers of inner part 271 to be joined only through mechanical means, rather than chemically bonding the layers with an adhesive. The use of first perforation 276, second perforation 278, third perforation 280, and fourth perforation 282, or any alternative number of perforations, allows the material forming second substratum 286 and third substratum 290 to flow into second substratum 286 within first substratum 270 and to flow outside first substratum 270 to form third substratum 290. This structure allows first substratum 270 to be mechanically sandwiched between second substratum 286 and third substratum 290, so that shifting or movement between first substratum 270 and second substratum 286 is minimized, as is shifting or movement between first substratum 270 and third substratum 290. In addition, the integral molding of second substratum 286 and third substratum 290, along with the interposition or sandwiching of first substratum 270 between second substratum 286 and third substratum 290, minimizes or eliminates shifting or relative movement between second substratum 286 and third substratum 290. This minimization or elimination of shifting is done only by the mechanical joining of first substratum 270, second substratum 286, and third substratum 290 of inner part 271.

Covering second stratum 284 may be cover 304. Cover 304 may substantially surround second stratum 284 and substantially spherical. Accordingly, cover 304 may have inner surface 306 and outer surface 308. Cover 304 covers first stratum 270 and all three substrata of second stratum 284. Inner surface 306 of cover 304 is desirably positioned adjacent outer surface 294 of third substratum 290. Outer surface 308 of cover 304 desirably forms the outer surface of the ball to be struck by a user's club. Cover 304 may be any generally conventional cover. The properties of cover 304 may be those described in connection with cover 116 in FIG. 1.

Cover 304 is desirably secured to inner part 271 chemically. In some embodiments, an adhesive may be applied to outer surface 294 of inner part 271 or inner surface 306 of cover 304 in embodiments where that is possible. Cover 304 may then be applied to outer surface 294. In some embodiments, cover 304 can be overmolded directly over inner part 271. In other embodiments, cover 304 can be made in two parts that are then pressed onto inner part 271 and fused together along a joinder line (not shown). When cover 304 comes into contact with inner part 271, the adhesive will cause cover 304 and inner part 271 to chemically bond with one another. The adhesive will bond cover 304 and inner part 271 and minimize the relative movement therebetween without the need for a physical locking structure to be molded into either cover 304 or inner part 271.

However, in other embodiments, cover 304 may be disposed on ball 200 in a manner that requires no adhesives. In one such embodiment, cover 304 may be injection molded onto inner part 271. Fingers of material may project outward from the surface of inner part 271, and the material of cover 304 may flow around these fingers. Once the material of cover 304 is cured and hardened, these fingers will be mechanically joined to cover 304. Similarly, in some embodiments, cover 304 may be injection molded onto inner part 271 after depressions have been formed in an outer surface of inner part 271. The material of cover 304 may flow into the depressions. Once the material of cover 304 has cured and hardened, the material of cover 304 has formed fingers that extend into and are surrounded by the material of inner part 271. These finger mechanically join cover 304 to inner part 271.

Outer surface 308 of cover 304 may be configured in a manner as described earlier in connection with outer surface 118 of FIG. 1. Similarly, the materials selected and limitations described in connection with outer core layer 104 may be analogously applied to first stratum 270 and the materials selected and limitations described in connection with core 102 and medial layer 114 may be analogously applied to second stratum 284. First stratum 270 and second stratum 284, together with all the sub parts thereof may be considered the internal stratum or part 271 of ball 200 and cover 304 may be considered the external stratum or part of ball 200.

Turning now to FIGS. 3-10, various embodiments and alternatives of methods that can be used to recycle a golf ball are disclosed. These embodiments and methods are described as including a variety of alternative options. Other methods may be easily substituted for those disclosed. Many alternatives to those disclosed specifically have also been enumerated. A person having ordinary skill in the art can make those substitutions and modifications, and those substitutions and modifications should be considered to come within the scope of the disclosure.

Figure 3:
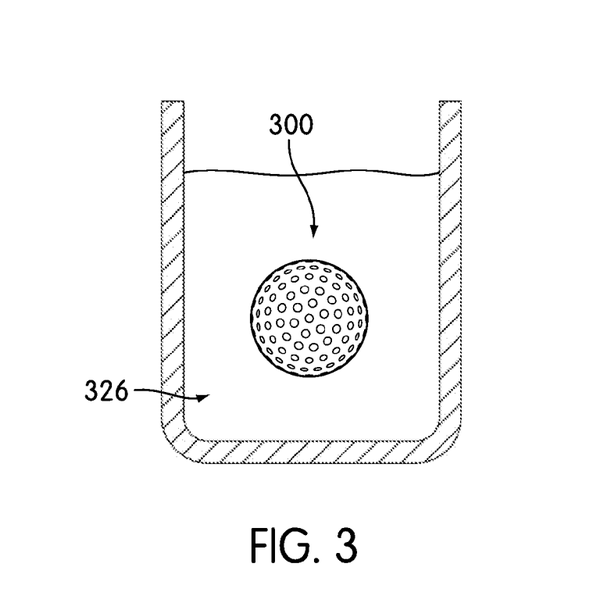
FIG. 3 is a cross sectional view of a water bath showing a golf ball undergoing a first heating step.
Figure 4:
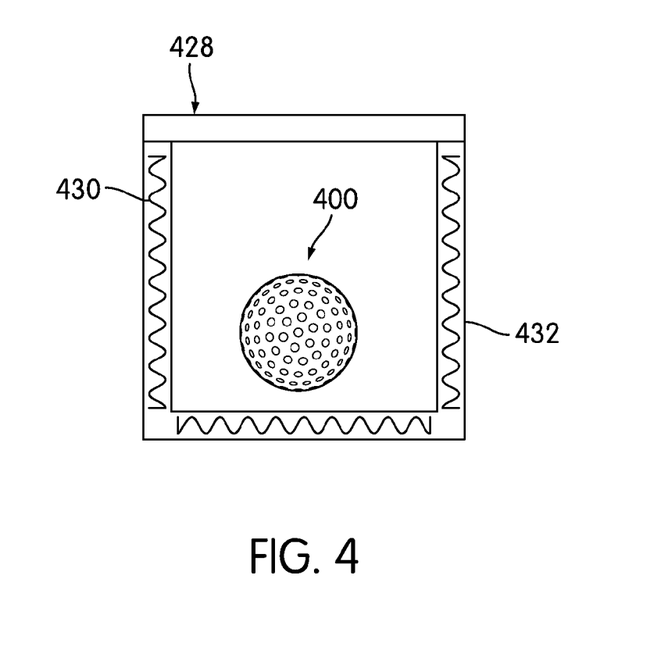
FIG. 4 is an alternative embodiment of a first heating step showing a cross sectional view of a golf ball undergoing a first heating step in an oven.

FIGS. 3 and 4 show a pretreatment for a golf ball that may be used as an initial step in a recycling method. In some embodiments, the application of a heat treatment, for example, may improve the results from the remainder of the recycling process. In other embodiments, it may be desirable to use a freezing process or a supplemental chemical or other soak treatment. Any of those processes could be considered equivalent to the heating treatment shown.

FIG. 3, for example, shows a ball 300 in a soaking fluid 326. The soaking fluid 326 could be a gas or gel, but in many embodiments is likely to be a liquid. Soaking fluid 326 is selected in cooperation with the material from which the cover of ball 300 is made. Soaking fluid 326 is used to change the properties of the cover of ball 300. In some embodiments, soaking fluid 326 may be a heated water bath. In other embodiments, soaking fluid 326 may be a cooled or supercooled bath. In other embodiments, soaking fluid 326 may be an acid or base that chemically reacts with the cover of ball 300.

FIG. 4, as another example, shows a ball 400 that is pretreated in a dry treatment chamber 428. The dry treatment chamber 428 is selected in cooperation with the material from which the cover of ball 400 is made and is used to change the properties of the cover of ball 400. In some embodiments, dry treatment chamber 428 may be an oven. In such an embodiment, treatment apparatus 430 may be, for example, a resistance heater embedded in the walls 432 of dry treatment chamber 428. In other embodiments, dry treatment chamber 428 may be a freezer or other cooling chamber. In such an embodiment, treatment apparatus 430 may be a compressor and fan in the walls 432 of dry treatment chamber 428. In other embodiments, dry treatment chamber 428 may be used to increase the pressure on the cover of ball 400 to create a cracking of the cover.

FIGS. 3 and 4 are examples of treatments. Other treatments could also be possible and could be substituted for the precise treatments and equipment shown in FIGS. 3 and 4. Any of these could be considered to be equivalent to those embodiments specifically disclosed. As noted, the pretreatment process may be optional or unnecessary in many embodiments.

It is also possible that the pretreatment process of FIGS. 3 and 4 be used to separate the cover and the inner part of the ball from one another. It is possible that, for example, a heat soak may allow the cover of the ball to be easily split and for the adhesive securing it to the inner part to deteriorate, so that the cover can be removed in one piece. In another embodiment, a cold treatment may make the cover and adhesive brittle and a slight impact to the cover may shatter the cover and leave the inner part intact for recycling. Because only the inner sections of the ball are typically available for recycling, the manner in which the cover is removed does not affect the recyclability of the cover.

Figure 5:
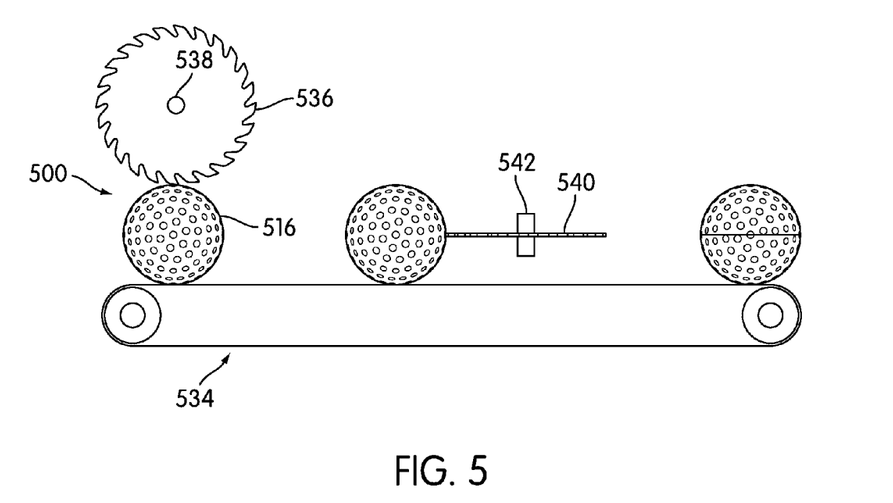
FIG. 5 is a side view of an exemplary embodiment of a step of cutting a ball into pieces.

Turning now to FIG. 5, a splitting or dividing step is shown. FIG. 5 shows a way to expose the cover 516 and core (not shown in this FIG.) of ball 500. After any desired pretreatment is completed, ball 500 can be placed on a conveyor 534. Conveyor 534 as shown in FIG. 5 is an example of a conveyor that would be appropriate and is shown in schematic form, rather than being a precise showing of a mechanism that could be used. Any mechanism designed that is capable of transporting balls 500 in a manner to keep them stable and to enable the splitting equipment to work effectively could be used instead of the conveyor 534 as shown in FIG. 5.

FIG. 5 shows two circular saw blades. First circular saw blade 536 is oriented vertically and is powered by drive shaft 538. Second circular saw blade 540 is oriented horizontally and is powered by drive shaft 542. The drive shafts can be powered by using any conventional or reasonable method, such as with an engine and a drive belt. In many embodiments, each ball 500 passes by first blade 536 and second blade 540. As each ball passes, it is engaged by first blade 536 and second blade 540. When first blade 536 and second blade 540 contact ball 500, they make a cut partially or completely through ball 500. In some embodiments, it may be desirable for first blade 536 and second blade 540 to be able to be raised or lowered to determine the depth of the cut made. In some instances, first blade 536 could include a pair of blades, one that is able to be raised and lowered from the top of ball 500 and another that projects and is able to be raised and lowered from the bottom of ball 500. Similarly, second blade 540 could include two blades, one on each side of ball 500. In some embodiments, it may be desirable for first blade 536 to comprise two blades that cut a substantial way through ball 500 and the horizontal cut from second blade 540 could finish severing the ball parts with a single cut.

In some embodiments, ball 500 finishes the pass down conveyor 534 in a configuration where the parts of ball 500 are all kept in approximately their original relative position. This is what is shown in FIG. 5. In such an instance, it may be that the first blade 536 and second blade 540 cut partially, rather than completely, through the inner part of ball 500. It may be necessary in such an instance for a human or machine to intervene and pull the partially divided pieces apart from one another to be used in the next step. In another embodiment, ball 500 may be completely severed into parts and will be ready for immediate use in the next recycling step.

FIG. 5 shows the use of only first blade 536 and second blade 540 oriented perpendicular to one another. It will be apparent to a person having ordinary skill in the art that a different number of splitters could be used and that the splitters or blades could be arranged at whatever angle the designer deems necessary or desirable to split the ball properly.

FIG. 5 shows the use of first blade 536 and second blade 540. First blade 536 and second blade 540 are both shown as being circular blades. However, other cutting mechanisms could be substituted for the circular blades shown. In other embodiments, a reciprocating saw could be used. In other embodiments, a guillotine style cutter could be used. In still other embodiments, a rotating string could be used. It is possible that a laser or other energy cutter could be used as well. A designer can select an appropriate cutting implement based on the depth of cut desired and the material of the ball that is desired to be cut.

Figure 6:
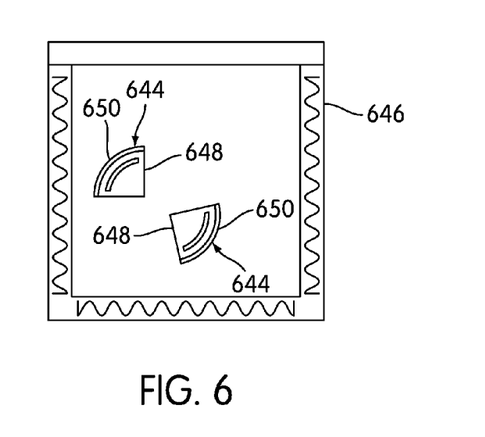
FIG. 6 is a cross sectional view of an oven showing pieces of a golf ball undergoing a second heating step.

Turning now to FIG. 6, once the ball has been separated into parts 644, parts 644 are placed into a treatment chamber 646. Treatment chamber 646 is shown in FIG. 6 as being a dry treatment chamber like that in FIG. 4 with a treatment structure embedded therein. In many embodiments, the treatment chamber will be an oven. The use of an oven may be desirable in some instances, as the inner part 648 of part 644 is often made from materials that become brittle when subjected to heat, thereby reducing the force necessary to remove it from the cover 650. In addition, the heat may soften the material from which cover 650 is made, making it more malleable. The heat may also serve to loosen the attachment of the adhesive to inner part 648 of each part 644, allowing the adhesive to be easily removed from inner part 648 of each part 644.

In other embodiments, treatment chamber 646 could be any of the dry or wet treatment chambers as described in connection with FIGS. 3 and 4. The treatment chamber appropriate in this step varies depending on the purpose of this step. Because cover 650 and inner part 648 may be made from different materials, an appropriate treatment chamber may be determined based on the properties of one or the other of cover 650 and inner part 648. Treatment chamber 646 may be designed to affect the properties of cover 650 and possibly the adhesive securing cover 650 to inner part 648. Treatment chamber 646 may be designed to affect the properties of cover 650 and the adhesive to make them more likely to separate from inner part 648. Alternatively, treatment chamber 646 may be designed to affect the properties of inner part 648 to make it more likely to separate from the adhesive and cover 650. In some embodiments, a single treatment chamber 646 embodiment may affect all cover 650, inner part 648, and the adhesive securing them together to facilitate the separation. Any option may be desirable or efficient, depending on the materials from cover 650 and inner part 648 are made and the composition of the adhesive.

In many embodiments where common golf ball materials are used, the materials selected for cover 650 are likely to become more malleable upon the application of heat. In addition, the materials selected for the various layers of inner part 648 are likely to become brittle under the application of heat. In this manner, the use of an oven or hot water soak as treatment chamber 646 would be desirable to facilitate the separation of inner part 648 and cover 650 from one another.

Figure 7:
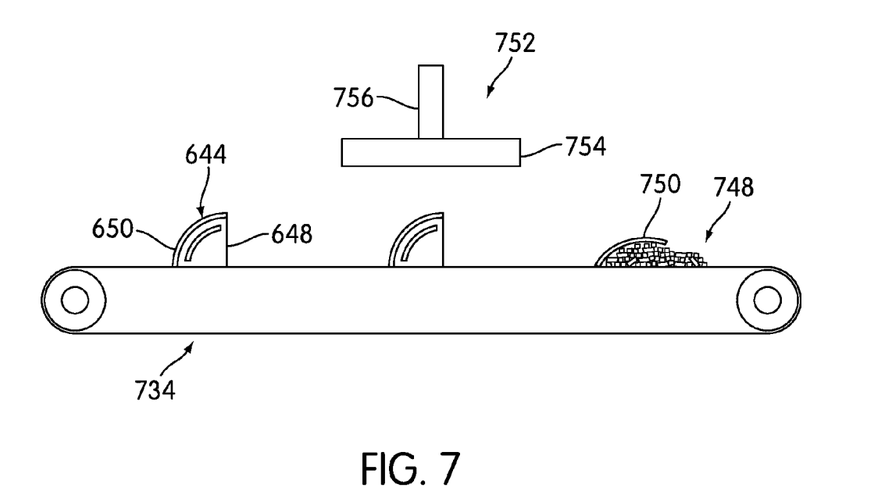
FIG. 7 is a side view of an exemplary embodiment of a press used to separate the cover and inner part from one another and to pulverize the inner part.

Turning now to FIG. 7, a structure capable of separating the treated ball parts or sections 644 is shown. After the ball sections 644 are treated in the treatment chamber of FIG. 6, they are placed on a conveyor 734. Conveyor 734 as shown in FIG. 7 is an example of a conveyor that would be appropriate and is shown in schematic form, rather than being a precise showing of a mechanism that could be used. Any mechanism designed that is capable of transporting ball sections 644 in a manner to keep them stable and to enable the use of a press, as will be described in greater detail below, could be used instead of the conveyor 734 as shown in FIG. 7.

The pretreated sections 644 move along conveyor until they are placed under press 752. Press 752 as shown in FIG. 7 is an example of a press that would be appropriate and is shown in schematic form, rather than being a precise showing of a mechanism that could be used. As shown in FIG. 7, press 752 may include plate 754 and reciprocating arm 756 used to press plate 754 down onto each ball section 644 separately or a plurality of ball sections 644 at once. Because ball sections 644 have, in this exemplary embodiment, been treated with a heat treatment in FIG. 6, cover 650 and the adhesive have become more malleable or flexible, while inner part 648 has become brittle. When plate 754 is pressed onto an exemplary ball section 644, cover 650 and the adhesive will tend to bend as plate 754 compresses cover 650 and the adhesive towards conveyor 734. In contrast, when plate 754 is pressed onto exemplary ball section 644, inner part 648 will tend to shatter. In this manner, plate 754 can easily pulverize inner part 648 into pieces through pretreatment with heat and compression. In addition, plate 754 can simultaneously pulverize inner part 648 and separate inner part 648 from cover 650 and the adhesive. This results in a separate cover and adhesive piece 750 and a plurality of inner part pieces 748 remaining after the application of pressure by plate 754. Cover and adhesive piece 750 is likely to be about the same shape and size as cover 650 was prior to treatment, although in some cases, it will be folded due to the pressure from plate 754 and may retain the folded shape. Inner part pieces 748, on the other hand, may be significantly smaller than inner part 648 before the application of pressure by plate 754.

Other modifications may be desirable. In some instances, it may be useful to separate the cover and adhesive from the inner parts in a particular step and then include a supplemental step to ensure the complete removal of the adhesive from the inner parts. In such an instance, the pretreatment chamber of FIG. 6 may be designed to deteriorate the adhesive and allow removal of the cover and adhesive layer in an intermediate step. A second intermediate step could include a grinding or chemical treatment of a surface of the inner part to ensure the complete removal of adhesive residue before the pulverizing step takes place.

After the pulverizing step takes place in FIG. 7, cover 750 and inner part pieces 748 have been separated from one another. However, it may be desirable for all the inner part pieces 748 from multiple ball sections 644 to be collected together to be treated simultaneously. Accordingly, it may be desirable to physically separate the covers 750 from the inner part pieces 748 for all the ball sections 644.

Figure 8:
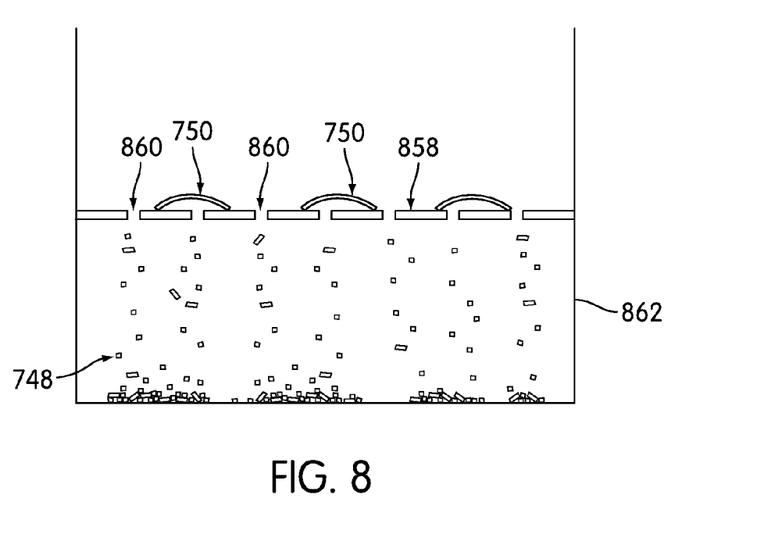
FIG. 8 is a cross sectional view of a screened container that is capable of separating the cover pieces from the pulverized inner part pieces.

Turning to FIG. 8, one exemplary separation structure 858 is shown. Separation structure 858 may desirably be a screen that includes holes 860. Holes 860 may be shaped and sized to allow inner part pieces 748 to pass through holes 860 while keeping covers 750 on top of separation structure 858. In some embodiments, conveyor 734 may incorporate separation structure 858 so that after the application of pressure, inner part pieces 748 drop through conveyor 734 to receptacle 862 for collection while transporting covers 750 on top of conveyor 734 to be collected elsewhere. Alternatively, conveyor 734 may be a solid piece and may deposit covers 750 and inner part pieces 748 into a separate receptacle 862 and separation structure 858 remote from press 752. Either option may be suitable depending on the layout of a particular facility or the desires of a particular designer. Any other separation structure or method could be considered equivalent, including, but not limited to, the use of one or more people or machines to reach onto a conveyor or into a receptacle and physically pick up and remove the cover and adhesive pieces. Such a system may be more time intensive, but could be desirable based on various economic conditions or based on space constraints in a facility.

After the physical separation of cover and adhesive pieces 750 from inner part pieces 748, cover and adhesive pieces 750 may be treated separately from inner part pieces 748. In some instances, it may be desirable to further treat cover and adhesive pieces to recycle some or all of the materials therein. In other instances, cover and adhesive pieces 750 may be discarded.

Inner part pieces 748, as noted above, include pieces that are made from a plurality of materials. As noted in FIG. 1, for example, core 102 and medial layer 114 may be made from a first material and outer core layer 104 may be made from a second material. The parts from these layers, in the course of the processes to this point, have been comingled with one another. In order to effectively recycle these pieces, in many instances, it may be desirable or necessary to separate the first material from the second material, as it may be easier, less expensive, or otherwise more desirable to reuse or recycle each material individually, rather than to recycle the blend of the materials together.

Figure 9:
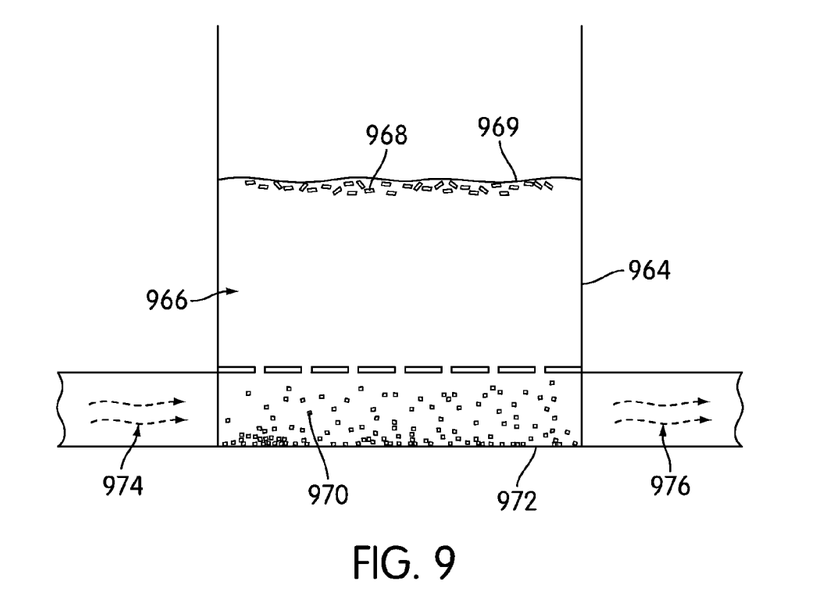
FIG. 9 is a cross sectional view of a first embodiment showing the pulverized inner part pieces separating in a fluid into two strata.
Figure 10:
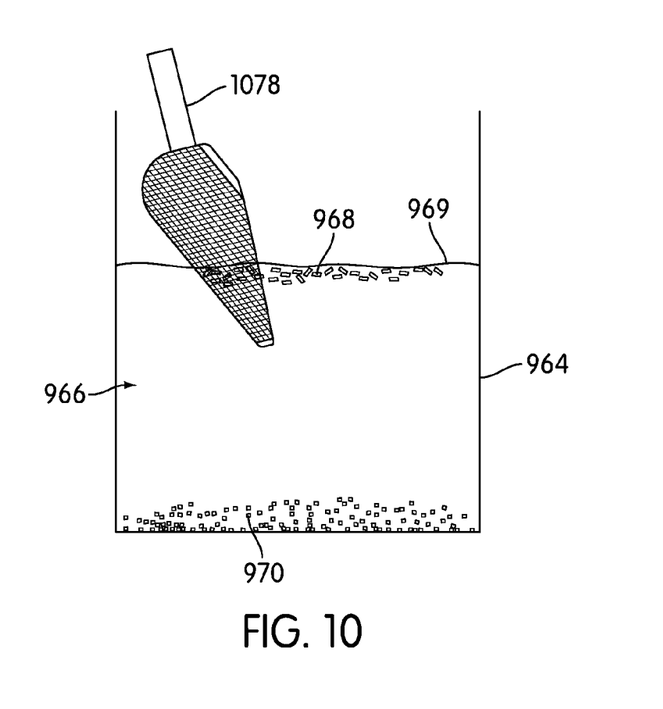
FIG. 10 is a cross sectional view of a second embodiment showing the pulverized inner part pieces separating in a fluid into two strata.

FIGS. 9 and 10 illustrate two exemplary embodiments that may be used to separate the inner part pieces 748 into the two materials described above in the description of FIG. 1. FIGS. 9 and 10 both show a reservoir 964 that holds a liquid 966. As noted in the description of FIG. 1, inner part pieces 748 include pieces of a first material that has a first density and pieces of a second material that has a second density. When inner part pieces 748 are introduced into liquid 966, it allows the two materials to separate based on their density relative to liquid 966. Liquid 966 may be water or may be another liquid. The liquid selected as liquid 966 should be selected so that some inner part pieces 968 are made of a material with a lower density, allowing them to float or rise to a level near surface 969 of liquid 966. Other inner part pieces 970 are made of a material having a higher density, allowing them to sink to a level near bottom 972 within liquid 966.

After inner part pieces 748 are introduced into liquid 966, and adequate passage of time has elapsed to allow inner part pieces 748 to separate into lower density inner part pieces 968 and higher density inner part pieces 970, a variety of structures can be used to collect low density pieces 968 separately from high density pieces 970. FIG. 9 shows an example where high density pieces 970 may be moved out of reservoir 964 by a current of water 974 that pushes pieces 970 out into a tube or other collection system 976. After the high density pieces 970 have been evacuated, the reservoir could be drained and the remaining pieces would be only low density pieces 968. FIG. 10 shows an example where a scoop or other collection system 1078 at the surface 969 of liquid 966 can be used to remove low density pieces 968. After the low density pieces are removed, reservoir 964 may be drained and the only remaining pieces would be high density pieces 970.

Many other structures and systems are well known in the industry for separately collecting particles from a surface of a liquid and particles from a bottom surface of a reservoir. Other systems and structures may be used interchangeably with the structures and systems described herein. For example, a shaker table or other filtering mechanism may be used to separate the different materials of a recycled ball after pulverization, as different materials may separate into differently-sized particles.

The embodiments described herein have been directed to a system where two materials having two densities have been used. It is possible that a ball may be developed that includes three or more materials in an inner part of a ball. Such a system could include, for example, a ball that had two outer core layers separated from one another. Other modifications may also be contemplated by a person having ordinary skill in the art. In such an instance, the recycling method described could still be used. In such an event, it would be desirable if the third material used had a third density different from the first density of the first material and the second density of the second material. If the three materials had different densities, a liquid could be selected that would allow the separation of the materials into three different strata within the liquid, rather than the two strata specifically shown in FIGS. 9 and 10. Separation of the materials into three strata allows the particles of material to be separated to be separately collected and recycled.

FIGS. 9 and 10 show the two materials separating such that particles of one material rise to a level near the top of the liquid and particles of the other material sink to a level near the bottom of the liquid. Such a dramatic separation need not take place. As long as the densities of the materials and the liquid are selected so that there is a separation of the materials to different levels is evident within the liquid, the separation need not be to the top and the bottom of the liquid. For example, one material could sink to a level near the bottom while the other material remained at a level in the middle of the reservoir. Such a separation may allow the materials to be easily separated with appropriate equipment.

The separation of the two or more materials through a system like that shown FIGS. 9 and 10 may be most effective only when the materials are only joined mechanically within the inner part of the ball. If the materials were joined chemically, as through an adhesive, the pulverizing step would be unlikely to completely separate the two internal materials. If some particles of the inner part include first material, second material, and adhesive, these particles will not be effectively separated in the same manner as the first material and the second material, as the density of such pieces cannot be predicted, as the effective density will depend on the proportions of each in each particle. Accordingly, such a joining method will increase greatly the complexity of the separation of particles by material, and may sufficiently muddy the boundaries between the particles as to make the system of FIGS. 9 and 10 ineffective in many embodiments. Accordingly, the use of a ball having an inner part made of two or more materials, where those materials are only mechanically joined, may be most desirable for use in connection with the present disclosure.

While various embodiments of the invention have been described, the description is intended to be exemplary, rather than limiting and it will be apparent to those of ordinary skill in the art that many more embodiments and implementations are possible that are within the scope of the disclosure. Accordingly, the disclosure is not to be restricted except in light of the attached claims and their equivalents. Also, various modifications and changes may be made within the scope of the attached claims.

What is claimed is:

1. A golf ball, comprising:
    an inner part having a first layer having perforations wherein the first layer is made from a first material and second and third layers on opposite sides of the first layer that are integrally formed from a same second material and mechanically secured to one another by projections of the second material through the perforations; and
    a cover only chemically secured to the inner part.

2. The golf ball according to claim 1, wherein the first material has a first density and the second material has a second density.

3. A method of recycling a golf ball, comprising:
    providing a golf ball according to claim 1;
    separating the cover and the inner part from one another;
    pulverizing the inner part into pieces; and
    separating the materials forming the inner part from one another.

4. The method of recycling a golf ball according to claim 3, wherein the step of separating the materials forming the inner part from one another comprises placing the pulverized inner part pieces into a specified fluid.

5. The method of recycling a golf ball according to claim 4, wherein each material forming the inner part has a different density and the step of separating the materials forming the inner part from one another further comprises allowing the materials to distribute within the fluid to different levels.

6. The method of recycling a golf ball according to claim 5, wherein the step of separating the materials forming the inner part from one another comprises separately removing the materials at different levels from the fluid.

7. The method of recycling a golf ball according to claim 3, further comprising removing adhesive from an exterior surface of the inner part.

8. The method of recycling a golf ball according to claim 7, wherein the step of removing the adhesive from the inner part comprises mechanically removing an outer layer from the inner part.

9. The method of recycling a golf ball according to claim 7, wherein the step of removing the adhesive from the inner part comprises chemically removing an outer layer from the inner part.

10. The method of recycling a golf ball according to claim 7, wherein the step of removing the cover from the inner part and the step of removing the adhesive from the inner part are performed as a single step.

11. The method of recycling a golf ball according to claim 3, further comprising heating the cover and the inner part.

12. The method of recycling the golf ball according to claim 3, wherein the step of separating the inner part and the cover from one another and the step of pulverizing the inner part are performed simultaneously.

* * * * *